(Model.)
C. DREW.
Toe Weight.
No. 240,977. Patented May 3, 1881.
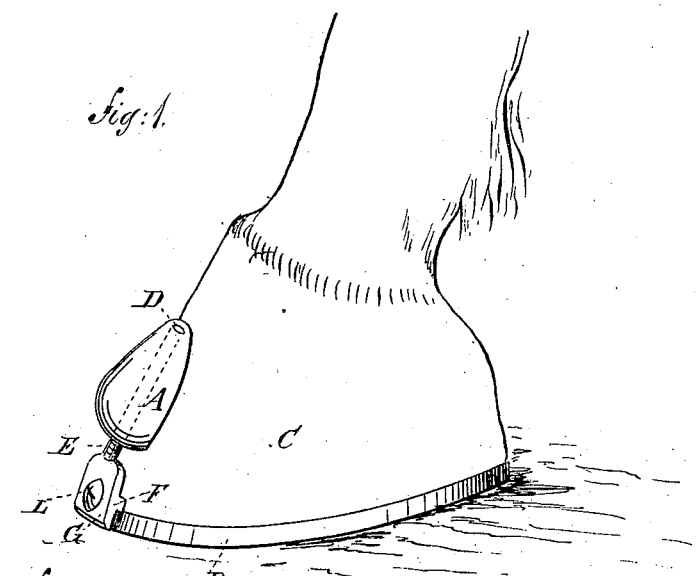
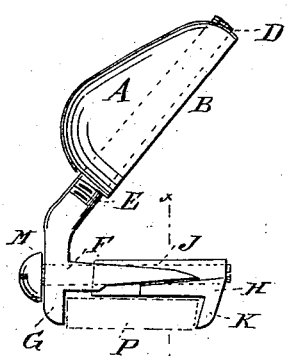
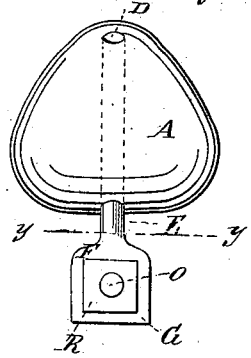
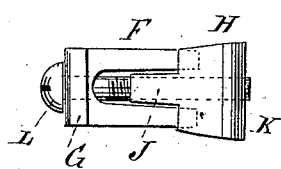
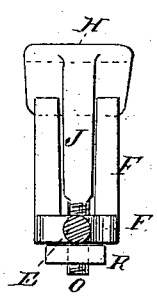
WITNESSES:
Chas. Nida
C. Sedgwick
INVENTOR:
C. Drew
BY Munn & Co
ATTORNEYS.

UNITED STATES PATENT OFFICE.

CHARLES DREW, OF ST. LOUIS, MISSOURI.

TOE-WEIGHT.

SPECIFICATION forming part of Letters Patent No. 240,977, dated May 3, 1881.

Application filed September 27, 1880. (Model.)

*To all whom it may concern:*

Be it known that I, CHARLES DREW, of St. Louis, in the State of Missouri, have invented a new and Improved Toe-Weight, of which the following is a specification.

The object of my invention is to provide a new and improved toe-weight to be attached to horses' hoofs, and which is so constructed to fit any style of horseshoe and does not injure the hoof, as it is entirely supported by the shoe.

The invention consists of a toe-weight provided with a longitudinal threaded perforation, in which a threaded pin takes, that is clamped to the horseshoe by means of clips catching in opposite edges of the shoe and held together by a screw.

In the accompanying drawings, Figure 1 is a perspective view of a horse's hoof provided with my improved toe-weight. Fig. 2 is a side elevation of my improved toe-weight. Fig. 3 is a plan view of the under side of the same. Fig. 4 is a cross-sectional elevation on the line $x\,x$, Fig. 2. Fig. 5 is a front elevation of the modification, showing the parts held together by a nut and screw. Fig. 6 is a horizontal sectional view of the same on the line $y\,y$, Fig. 5.

Similar letters of reference indicate corresponding parts.

The toe-weight A is planed down smooth on the inner side, B, so as to fit well against the hoof C, and is provided with a longitudinal threaded perforation, D, near the inner side, B. A screw, E, fitting in the perforation D, is attached to a forked clip, F, at an inclination about equal to that of a horse's hoof. The forked clip F is provided with a downward-projecting flange, G, the inner edge of which is preferably inclined inward. The under sides of the prongs of the forked clip F are beveled, so as to fit against the beveled clip H, provided with a central shank, J, and with an inwardly-beveled end flange, K, of the same shape as the flange G. A screw, L, passes through an aperture, M, in the front of the clip F, and takes in a longitudinal threaded perforation, N, of the shank J, thereby pressing the flanges G and K against the outer and inner edges, respectively, of the horseshoe P; but, if desired, the shank J may be extended so as to pass through the aperture M, and its outer end, O, is threaded so as to receive a nut, R, by means of which the clips F and H—that is to say, their respective flanges G and K—are drawn together.

The toe-weight is attached to the horseshoe as follows: The screw L or the nut R is loosened so as to permit of the two clips F and H being separated. The fork of the clip F is then passed through the space between the hoof and the shoe from front to rear, and the clip H is passed through the same space from the rear to the front, so as to pass in between the shanks of the clip F. The screw L is then passed into the aperture M, or the nut R is screwed upon the end of the shank J, and is then drawn up tight, whereby the two flanges G and K are drawn together, and are secured against the inner and outer edges of the shoe with sufficient force to hold them to it. The toe-weight A is entirely supported by the shoe, and does not bear upon the hoof or wear off the same, and it can be easily attached or detached without the assistance of a blacksmith.

Having thus described my invention, I claim as new and desire to secure by Letters Patent—

1. The combination, with the toe-weight A, provided with a longitudinal threaded perforation, D, of the screw E, the clips F and H, the shoe P, and of a binding-screw, substantially as herein shown and described, and for the purpose set forth.

2. In a toe-weight, the clips F, constructed, substantially as herein shown and described, with fork shanks or prongs, with a flange, G, an aperture, M, and an inclined screw, E, as and for the purpose set forth.

CHARLES DREW.

Witnesses:
 CHARLES TRABER,
 FRANCIS McGRATH.